Dec. 29, 1931. O. S. BEATTIE 1,838,733
POWER TRANSMISSION MECHANISM
Filed Feb. 16, 1929 3 Sheets-Sheet 1
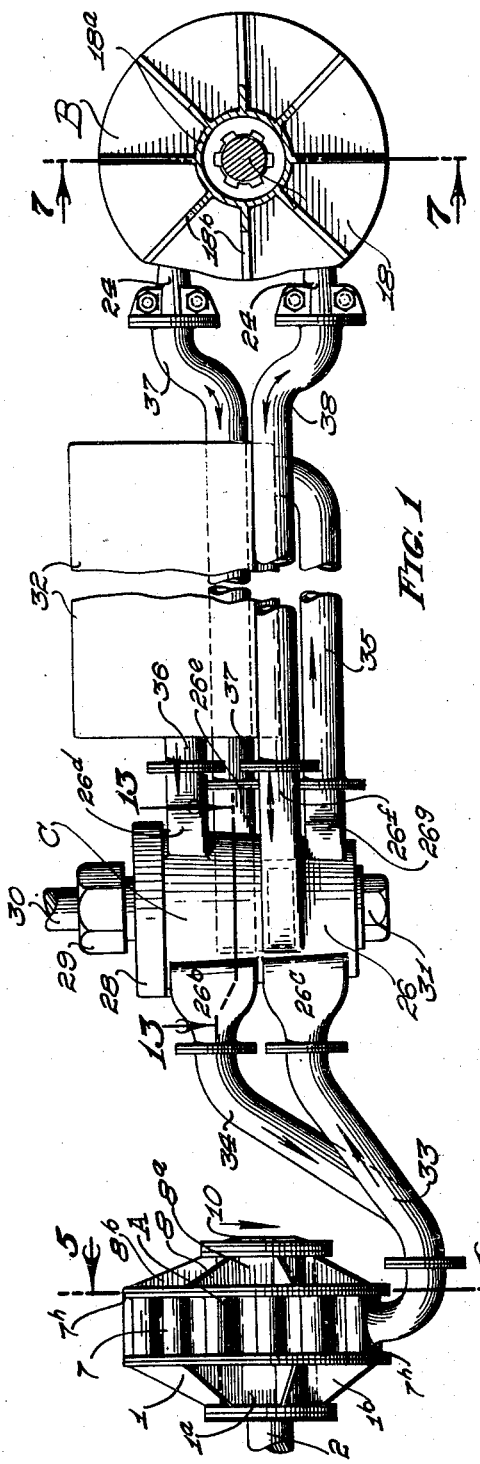
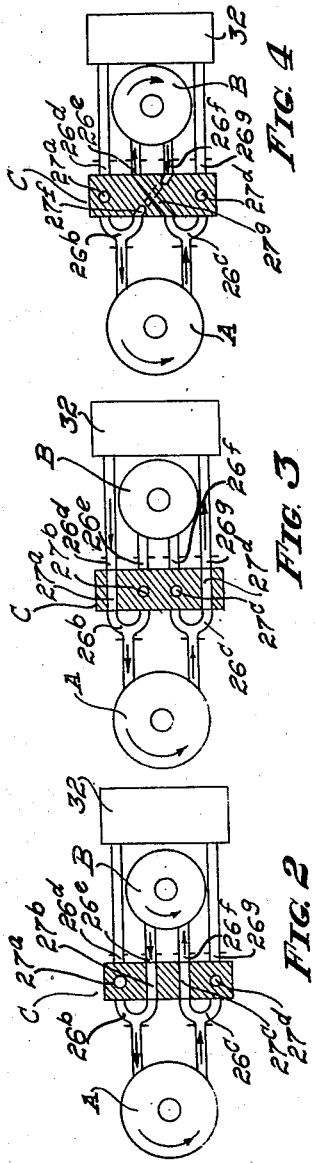
INVENTOR.
ORVILLE S. BEATTIE
BY
A.B.Bowman
ATTORNEY Dec. 29, 1931.   O. S. BEATTIE   1,838,733
POWER TRANSMISSION MECHANISM
Filed Feb. 16, 1929   3 Sheets-Sheet 2
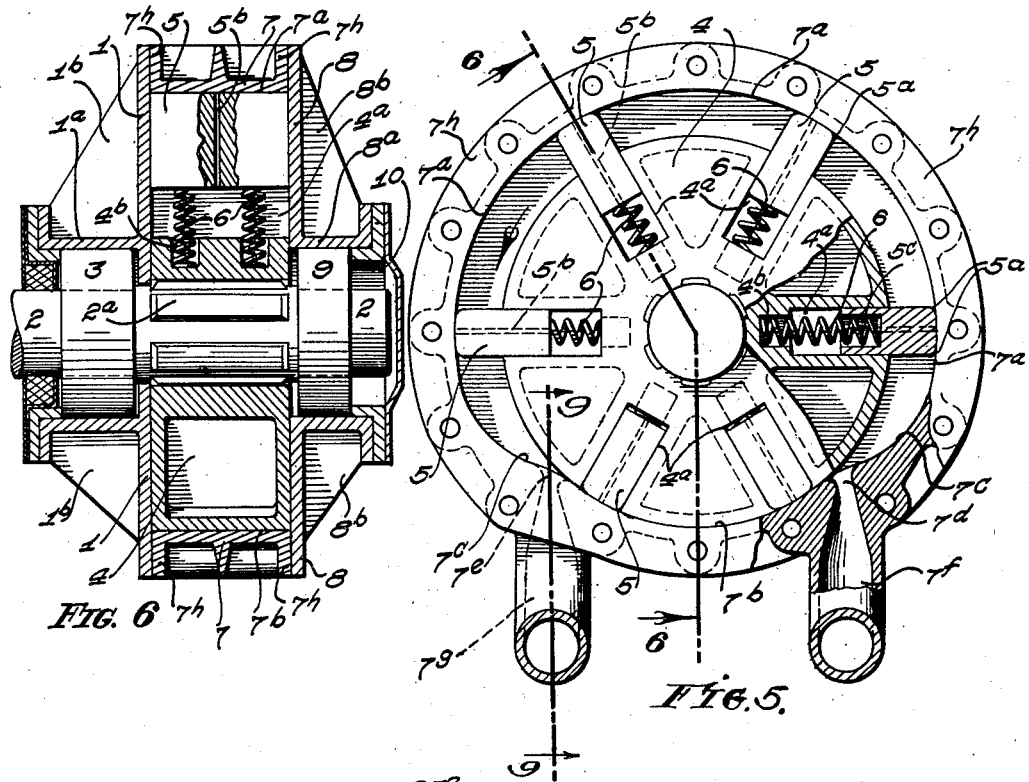
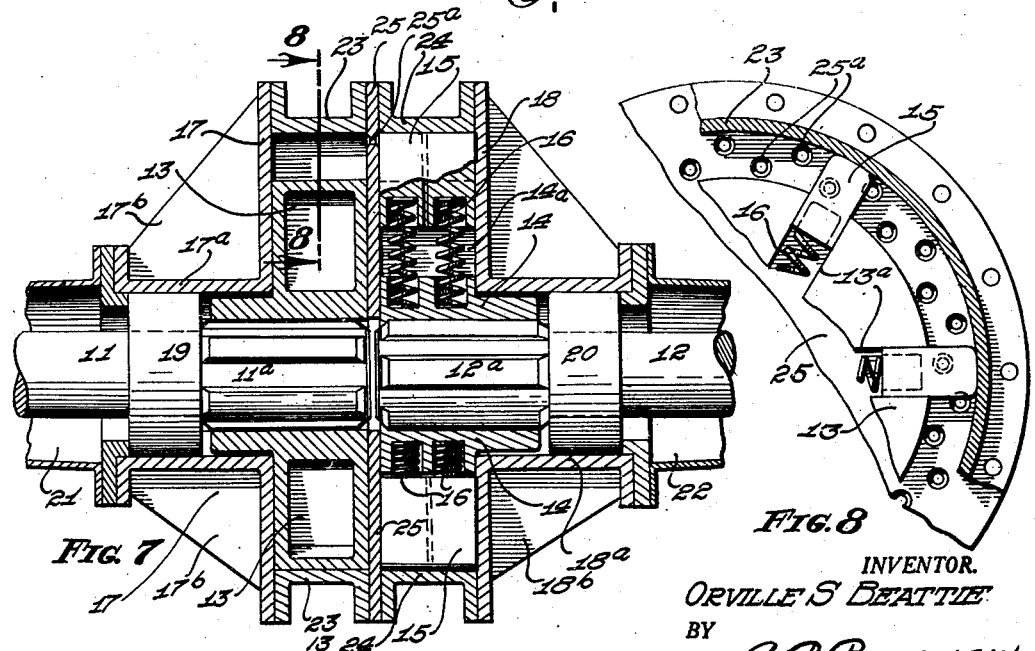
INVENTOR.
ORVILLE S. BEATTIE
BY
A. B. Bowman
ATTORNEY

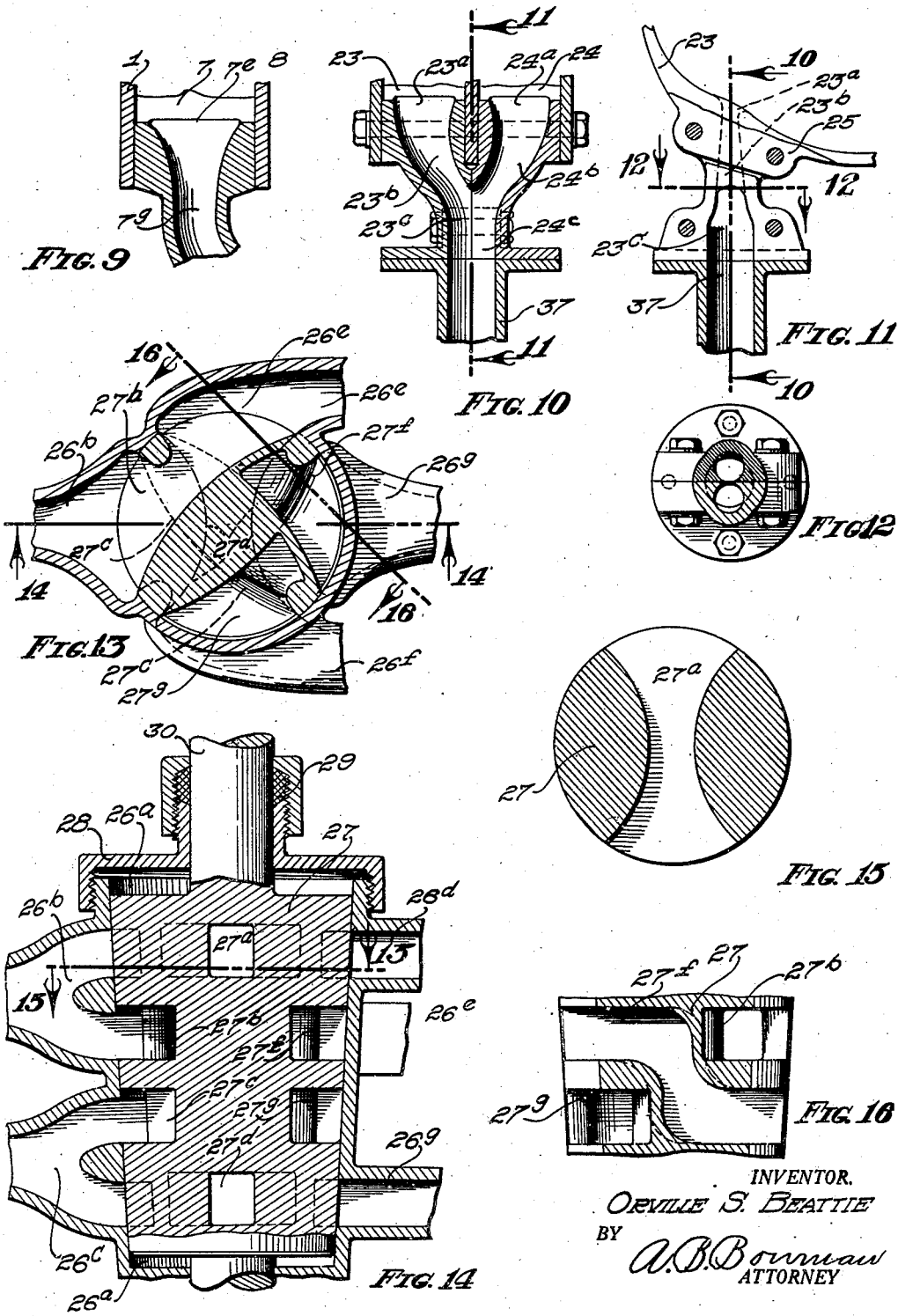

Patented Dec. 29, 1931

1,838,733

UNITED STATES PATENT OFFICE

ORVILLE S. BEATTIE, OF SAN DIEGO, CALIFORNIA, ASSIGNOR, BY DIRECT AND MESNE ASSIGNMENTS, OF THIRTEEN-SIXTIETHS TO L. S. MURRAY, OF SAN DIEGO, CALIFORNIA, AND SEVEN-THIRTIETHS TO J. B. COKER, OF SAN DIEGO, CALIFORNIA

POWER TRANSMISSION MECHANISM

Application filed February 16, 1929. Serial No. 340,577.

My invention relates to power transmission mechanisms and the objects of my invention are: first, to provide a mechanism of this class in which hydraulic pressure is used to transmit power; second, to provide a device of this class in which a hydraulic pressure generator drives a hydraulically operated motor; third, to provide a mechanism of this class in which the power transmitted is controlled by valves connected between the generator and motor; fourth, to provide a mechanism of this class in which a composite valve operated by a single rod controls the speed and direction of the motor, yet permits the generator to run at an approximately constant speed; fifth, to provide a mechanism of this class in which the motor is composed of two independently operable halves sharing the same inlet and outlet so that the speed of one may vary relative to the speed of the other, thereby enabling said motor to act as a differential; seventh, to provide a mechanism of this class which is foolproof, there being no gears or the like to clash when changing speed; eighth, to provide a mechanism of this class in which friction in the motor and generator is reduced to a minimum; ninth, to provide a mechanism of this class in which the motor and generator may revolve equally well in either direction; tenth, to provide a mechanism of this class which is especially adapted for automobiles or other land vehicles as the speed of the motor may be easily varied without jar, vibration or the like; eleventh, to provide a mechanism of this class in which the generator operated by a suitable power plant may be used to drive several motors, thereby enabling the mechanism to be used in connection with multi-motored aircraft, and twelfth, to provide a mechanism of this class which is simple of construction, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claim, reference being had to the accompanying drawings and to the characters of reference thereon which form a part of this application in which:

Figure 1 is a fragmentary side elevational view of my transmission with parts and portions shown in section to facilitate the illustration; Figs. 2, 3 and 4 are diagrammatical views of my mechanism; Fig. 5 is an enlarged elevational view substantially from the line 5—5 of Fig. 1 with the casing side member removed and parts and portions in section to facilitate the illustration; Fig. 6 is a sectional view substantially through 6—6 of Fig. 5 with parts and portions in elevation to facilitate the illustration; Fig. 7 is a sectional view of the motor taken through 7—7 of Fig. 1, with parts and portions in elevation to facilitate the illustration; Fig. 8 is a fragmentary sectional view of the motor through 8—8 of Fig. 7; Fig. 9 is a fragmentary sectional view of the generator through 9—9 of Fig. 5; Fig. 10 is a fragmentary sectional view of the motor through 10—10 of Fig. 11; Fig. 11 is a fragmentary sectional view thereof through 11—11 of Fig. 10; Fig. 12 is a sectional view thereof through 12—12 of Fig. 11; Fig. 13 is an enlarged transverse fragmentary sectional view through the valve mechanism taken through 13—13 of Fig. 1; Fig. 14 is a fragmentary sectional view of the valves taken through 14—14 of Fig. 13; Fig. 15 is a transverse sectional view of the valve plug taken through 15—15 of Fig. 14, and Fig. 16 is a fragmentary sectional view of the valve plug taken through 16—16 of Fig. 13.

Similar characters of reference refer to similar parts and portions throughout the several views of the drawings.

My power transmission and differential mechanism comprises a generator mechanism A, including an end plate 1, drive shaft 2, bearing 3, rotor 4, slide bars or vanes 5, springs 6, casing 7, end plate 8, bearing 9, and bearing cap 10; a motor and differential mechanism B including axles 11 and 12, rotors 13 and 14, slide bars or vanes 15, springs 16, side plates 17 and 18, bearings 19 and 20, axle housings 21 and 22, casing members 23 and 24, and a partition plate 25; a valve mechanism C including a valve housing 26, valve plug 27, valve plug cap 28, valve plug packing gland 29, valve plug operating rod 30, and valve plug adjusting means 31; and miscellaneous mechanism including a reservoir 32, outlet pipe generator to valve 33, inlet pipe valve to generator 34, inlet pipe valve to reservoir 35, outlet pipe reservoir to valve 36, and pipes valve to motor 37 and 38.

The end plate 1 of the generator mechanism A is provided with a centrally located cylindrical housing portion 1a adapted to enclose the bearing 3 which supports the drive shaft 2. The bearing housing portion 1a extends outwardly or axially from the one side of the end plate so that the other side of said end plate is substantially flat, as shown best in Fig. 6. Webs 1b extend between the end plate 1 and its bearing housing 1a. The drive shaft 2 protrudes through the end plate 1 and is provided with a splined end 2a upon which is secured the rotor 4.

The rotor 4 is substantially cylindrical and is provided with a plurality of radially extending slots 4a which intersect the end walls and periphery of said rotor. Except for the slots, the periphery of the rotor forms a smooth surface. In order to reduce the weight of the rotor, portions of the material between the several slots may be removed, as indicated in Figs. 5 and 6, leaving sufficient material to form the side walls of the slots 4a, the end walls of the rotor, and a peripheral rim.

Mounted in each slot 4a is a slide bar 5 which is substantially the width of the rotor. The extended end of each slide bar is provided with rounded corners 5a. One or more small passages 5b project through each slide bar from the extended to the inner end thereof, as shown in Figs. 5 and 6. These passages permit any fluid which may be in the chamber formed by each slot 4a and its slide bar to escape or enter as said chamber is varied in size due to the reciprocal movement of the slide bar relative to its slot.

Sockets 4b are provided in the base of each slot 4a. Similar sockets 5c are provided in the inner end of each slide bar 5. Springs 6 extend between the base of these sockets 4b and their corresponding sockets 5c. These springs tend to force the slide bars out of their respective slots.

The radial movement of these slide bars 5 is limited by the casing 7. The casing 7 is approximately cylindrical in form, and has an axial length equal to that of the rotor.

The inner surface of the casing is smooth and acts as a cam for shifting the several slide bars. The minor portion 7a of this cam surface, that portion having the largest radius, forms the greater portion of the inner periphery of the casing, has a constant radius, and holds the several slide bars in their extended positions so as to divide the space between the rotor and the minor portion 7a of the cam into a plurality of arcuate chambers, as shown in Fig. 5. The major portion 7b of this cam surface, that portion having the smaller radius, has a constant radius, is adjacent to the rotor and forms a relatively fluid tight seal therewith. This major portion 7b extends a distance slightly greater than the distance between two adjacent slide bars, as shown in Fig. 5. The cam surfaces 7c between the major and minor portions merge gradually into said major and minor portions, as shown in Fig. 5, so that the slide bars, when rotating, are caused to reciprocate in their respective slots with a minimum of jar or vibration.

The cam surfaces 7c are provided adjacent to the major cam portion 7b with transversely extending slots 7b and 7e. The slot 7d forms the intake of the generator, while the slot 7e forms the outlet thereof. The construction of the slots 7d and 7e is similar. Each one terminates short of the side margins of the casing 7 so that the several slide bars may easily pass over. The slot 7d extends downwardly and becomes circular in cross section as it does so forming a passage 7f having a flanged end to which is secured a connecting pipe, to be described hereinafter. Similarly the outlet slot 7e merges into a passage 7g of circular cross section, also having a flanged end to which is secured a pipe, to be described hereinafter.

The end plate 8, similar to the end plate 1, rests against the side of the rotor opposite from said end plate 1. The end plate 8 is provided with a cylindrical housing portion 8a extending axially from the rotor 4 adapted to support the bearing 9 mounted on the shaft 2. A suitable bearing cap 10 encloses this bearing, as shown in Fig. 6. Webs 8b are used to strengthen the end plate 8.

The housing 7 is provided with flanged portions 7h which extend outwardly from its end margins substantially flush with the ends of the rotor. Bolts, not shown, extend through the peripheral portions of the end plates 1 and 8 and the flanges 7h and hold the several members together so as to completely encase the rotor.

In many cases the motor mechanism B may be made identical to the generator but if my transmission mechanism is used in connection with a vehicle, the motor may be made to act as a differential. If the motor mechanism is mounted in place of the conventional differential of a vehicle, the rear axles 11 and 12 of the vehicle are provided with splined ends 11a and 12a respectively. These splined ends abut each other, as shown in Fig. 7. Rotors 13 and 14 are mounted upon the axles 11 and 12 respectively.

These rotors are similar in construction to the rotor 4 of the generator, the rotors having slots 13a and 14a respectively extending radially and intersecting their peripheries and the side margins.

A slide bar 15 is mounted in each slot of the rotors 13 and 14. Springs 16 tend to force these slide bars radially.

The outer end of the rotor 13 is provided with a side plate 17, while the rotor 14 is provided with a similar side plate 18. The side plate 17 is provided with an axially extending housing 17a which supports a bearing 19 mounted on the shaft 11. The extended end of the housing 17a is secured to an axle housing 21, shown fragmentarily in Fig. 7. Webs 17b reinforce the side plate 17. Similarly the side plate 18 is provided with a housing portion 18a which supports a bearing 20 mounted on the axle 12. The side plate 18 is secured to an axle housing 22, similar to the axle housing 21, as shown in Fig. 7.

The rotor 13 is enclosed by a casing 23 having an inner periphery which forms a cam surface identical to the cam surface of the casing 7. The casing 23 is just as wide as the rotor 13 and is provided with outwardly extending flanges for enabling it to be secured to the side plate 17. An identical housing 24 is provided for the rotor 14. This housing also has outwardly extending flanges to permit its being secured to the side plate 18. The housings 23 and 24 are separated one from the other by a partition plate 25. This plate has tiny openings 25a therein which communicate between the spaces formed between the housings 23 and 24 and their respective rotors and which permit the slight interchanging of fluid from one of these spaces to the other. If it should be necessary for one axle to turn slower than the other, a very small quantity of fluid may pass through the holes 25a into the opposite chamber formed between the rotor and its casing and thereby equalize the force and permit the necessary relative movement of the two axles.

Except for the motor being double and consequently the two rotors being smaller in width, and the inlet and outlet passages being bifurcated, a cross section through either one of the motor halves is similar to the elevational view of the generator shown in Fig. 5.

The motor is provided with two passages corresponding to the passages 7f and 7g of the generator casing, as shown in Figs. 10, 11 and 12. The casing member 23 is provided with a pair of slots 23a located in a similar relation to the casing as the slots 7d and 7e of the generator. These slots form the mouths of passages 23b. Each of these passages is formed into a semi-cylindrical channel the inner surface of which is flush with the inner end of the casing 23. Similar slots 24a form the ends of passages 24b which merge into other semi-cylindrical channels 24c, the inner surfaces of which are flush with the inner surface of the casing 24. These channels 23c and 24c are adapted to complement each other and form a passage of circular cross section having an area substantially equal to the inlet and outlet passages of the generator A. Pipe means, to be described hereinafter, connect the motor with the valve mechanism C, also to be described hereinafter.

As shown in Fig. 1, the valve mechanism C is provided with a valve casing 26 having a plurality of ports extending therefrom. The valve casing is provided with a tapered bore 26a intersecting each of the various ports. Mounted in the bore 26a is a correspondingly tapered valve plug 27. A valve plug cap 28 covers the valve plug and is provided with a packing gland 29 which forms a fluid tight joint with the valve operating rod 30 secured to or made integral and extending upwardly from the valve plug 27. The valve plug is provided with four tiers of passages in order to properly control the flow of a suitable hydraulic power transmitting medium.

The casing 26 is provided with a double port 26b which intersects the bore 26a in alinement with the upper two tiers of passages in the valve plug 27. A similar double port 26c intersects the bore 26a below the port 26b and opposite the lower two tiers of passages in the valve plug.

A single port 26d intersects the bore 26a diametrically opposite the upper opening of the double port 26b. A passage 27a extends diametrically through the plug 27 in alinement with the port 26d and forms the upper tier of the passages in the plug 27.

A second single port 26e intersects the bore 26a in a plane with the lower opening of the double port 26b at right angles thereto. A passage 27b extends diagonally through the plug with its openings intersecting the plug at right angles to each other so as to communicate, when the plug is in the position shown in Fig. 13, between the port 26b and the port 26e. This passage forms the second tier of passages in the plug.

A third single port 26f intersects the bore 26a in plane with the upper opening of the double port 26c at right angles thereto and on the opposite side of the casing from the port 26e. A passage 27c having its openings at right angles to each other communicates between the upper opening of the double port 26c and the third single port 26f. This passage 27c is similar to the passage 27b. Its one opening is immediately below the one opening of the passage 27b, while its other opening is diametrically opposite the corresponding opening of the passage 27b. This passage 27c forms the third tier of the passages.

A fourth single port 26g intersects the bore 26a opposite the lower opening of the double port 26c. A passage 27d extends diametrically through the plug 27 directly below and in the same direction as the passage 27a. This passage 27d communicates between the port 26g and the lower opening of the double port 26c. This passage forms the fourth tier of passages in the plug.

Two other passages 27f and 27g are provided in the plug 27. The passage 27f extends diagonally across the plug 27, its one or lower opening intersecting the wall of the plug immediately below an opening of the passage 27b and diametrically opposite an opening of the passage 27c, as shown in Fig. 13. This lower opening of the passage 27f is in the third tier. The other or upper opening of the passage 27f is in the second tier and intersects the wall of the plug one-quarter of the way around in a clockwise direction from the lower opening of said passage 27f. This upper opening, when in the position shown in Fig. 13, is diametrically opposite the double port 26b. The passage 27f passes from one tier to the other between the walls of the passages 27b and 27g, as shown best in Fig. 16.

The passage 27g is similar to the passage 27f. Its lower opening intersects the wall of the plug in the third tier immediately below the upper opening of the passage 27f, as shown in Figs. 13, 14 and 16. The other or upper opening of the passage 27g intersects the wall of the plug substantially at right angles to its lower opening. When the plug is in the position shown in Fig. 13, this latter or upper opening of the passage 27g is in the second tier of passages diametrically opposite the port 26d. The operation of this valve will be described hereinafter.

The several passages in the plug 27 and the ports in the valve casing 26 are widened at their openings so that one or more ports will register as the other set of ports begin to close. Thus the valve may be left in any position without danger.

The lower end of the valve plug extends through its casing and is provided with a suitable adjusting means 31.

The double port 26c is connected with the outlet passage 7e of the generator by means of the outlet pipe generator to valve 33. The double port 26b is connected to the intake passage 7d of the generator by means of the intake pipe valve to generator 34.

A reservoir 32 is provided, its inlet connected to the port 26g by means of the inlet pipe valve to reservoir 35. The outlet of the reservoir is connected to the port 26d by the outlet pipe reservoir to valve 36. The port 26e is connected to the upper one of the passages to the motor by means of a pipe 37, while the port 26f communicates with the lower passage of the motor by means of a pipe 38.

My mechanism is operated as follows: The generator, various connecting pipes, valves, motor and reservoir, are filled with a suitable liquid, such as oil, glycerine, water, or the like, preferably a liquid which also functions as a lubricant. The generator A is connected to a suitable prime mover, not shown. Normally the rotor of the generator is rotated in the direction shown by the arrow in Figs. 1 and 5.

When it is desired to rotate the motor in one direction, shown in Fig. 2, the valve is set in the position shown in Fig. 2 and in Figs. 13, 14, 15 and 16. In this position the passages 27d and 27a which communicate between the generator and the inlet and outlet, respectively, of the reservoir, extend transversely with the valve and close any communication between the generator and reservoir. When the valve is in this position, the passage 27c permits the power transmitting fluid to pass from the outlet of the generator to the lower port of the motor, and the passage 27b permits the return flow of the fluid from the motor to the intake port of the generator.

When the valve is turned clockwise 90 degrees it is in the position indicated in the diagram in Fig. 3. The fluid now passes from the generator, through the reservoir and back, utilizing the passages 27d and 27a. When in this position the motor is not revolving and is in neutral position.

It is obvious that for every position of the valve between those shown in Figs. 2 and 3, the motor would have a corresponding speed. Thus by shifting the valve counterclockwise from the position shown in Fig. 3 to the position shown in Fig. 2, the motor will start from a neutral position and advance to full speed.

The passages 27e and 27f cause a reverse movement of the motor, as shown in Fig. 4. The circuit when the motor is running in reverse direction is as follows: The fluid passes from the outlet of the generator, through the passage 27g to the upper port of the motor, and then through the motor and back through the passage 27f.

By the above described arrangement of passages the motor is caused to advance from neutral to full speed ahead during the first quarter turn; to slacken in speed until it reaches neutral again during the second quarter; to advance from neutral to full speed reverse during the third quarter; and to again slacken its speed until in neutral during the fourth quarter.

By providing the arrangement of the rotor, slide bars and casing shown in Fig. 5 for the generator and both motor halves, every one of the arcuate chambers formed between the rotor, casing and slide bars will be full of the hydraulic power medium. Thus the hydraulic power medium in the other chambers prevents the hydraulic power medium in the discharging chamber from passing anywhere but out the opening. Therefore, the generator and motors handle the hydraulic power medium with little or no slippage regardless of the speed of rotation or pressure of the hydraulic power medium.

When a hydraulic power medium which is also a lubricating fluid is used, the friction of the various working parts in the motor and generator is extremely low.

The passages 5b through the various slide bars conduct lubricant from the chambers formed in said slide bars and assist in the lubrication of the major portions of the cam surfaces.

As before stated, when it is necessary for one axle to move relative to the other, the unequal movement of the rotors 13 and 14 is permitted because of the small perforations in the partition plate 25 and because of the common inlets and outlets 37 and 38.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claim.

Having thus described my invention, what I claim as new and desire to secure by Letters Patent is:

In a power transmission mechanism, a pump for propelling fluid, a plug valve including a casing, a single plug revolubly mounted therein, said plug having a plurality of substantially diametrical passages extending therethrough, said passages arranged one above the other in four levels, a pair of diagonal cross related passages extending from one level to an adjacent level, a port in said casing adapted to register with the passages in the two upper levels, a second port adapted to register with the passages in the two lower levels, means connecting said pump with said ports, a second pair of ports adapted to register with the passages in the intermediate levels, a fluid motor, said second pair of ports connected with said motor, a third pair of ports adapted to register with the passages in the upper and lower levels and a fluid tank connected to said third pair of ports, said valve adapted to direct the fluid in varying proportion through the upper and lower passages to said tank and through said diametrical passages in the intermediate levels to said motor when said valve is moved in one direction, and through said cross passages in a reverse direction to said motor when moved in a reverse direction.

In testimony whereof, I have hereunto set my hand at San Diego, California, this 11th day of February, 1929.

ORVILLE S. BEATTIE.